US012414623B2

(12) United States Patent
Pulfrey

(10) Patent No.: US 12,414,623 B2
(45) Date of Patent: Sep. 16, 2025

(54) HAIR CARE DEVICE

(71) Applicant: Tangle Teezer Limited, London (GB)

(72) Inventor: Shaun Pulfrey, London (GB)

(73) Assignee: Tangle Teezer Limited, London (GB)

( * ) Notice: Subject to any disclaimer, the term of this patent is extended or adjusted under 35 U.S.C. 154(b) by 0 days.

(21) Appl. No.: 18/368,229

(22) Filed: Sep. 14, 2023

(65) Prior Publication Data

US 2024/0000221 A1 Jan. 4, 2024

Related U.S. Application Data

(63) Continuation of application No. 17/978,374, filed on Nov. 1, 2022, now Pat. No. 11,779,101, which is a (Continued)

(30) Foreign Application Priority Data

Mar. 23, 2007 (GB) ..................................... 0705570

(51) Int. Cl.
*A46B 9/02* (2006.01)
*A45D 7/00* (2006.01)
(Continued)

(52) U.S. Cl.
CPC ................ *A46B 9/023* (2013.01); *A46B 3/20* (2013.01); *A46B 3/22* (2013.01); *A46B 5/021* (2013.01);
(Continued)

(58) Field of Classification Search
CPC .... A46B 3/00; A46B 3/20; A46B 3/22; A46B 9/00; A46B 9/023; A46B 9/026;
(Continued)

(56) References Cited

U.S. PATENT DOCUMENTS 183,758 A 10/1876 Furter
502,513 A 8/1893 Giesecke
(Continued)

FOREIGN PATENT DOCUMENTS

CN 22811645 Y 5/1998
DE 2622161 A1 12/1977
(Continued)

OTHER PUBLICATIONS

CPME0943525P—Chinese request for the invalidation; petitioner Guangzhou Yingman Investment Management Co., Ltd., dated Sep. 4, 2019.

(Continued)

*Primary Examiner* — Shay Karls
(74) *Attorney, Agent, or Firm* — Pleit Intellectual Property Law; Paul D. Bianco

(57) ABSTRACT

A hair care device for use in untangling hair includes a body portion and a plurality of substantially parallel flexible bristles made of soft plastics material and projecting from the body portion. The bristles are arranged such that over at least a part of the area of bristles, some of the bristles are of shorter length. The bristles and the shorter length bristles are interspersed over the at least part of the area of bristles.

21 Claims, 4 Drawing Sheets

Related U.S. Application Data continuation of application No. 16/824,622, filed on Mar. 19, 2020, now Pat. No. 11,490,720, which is a continuation of application No. 14/977,739, filed on Dec. 22, 2015, now Pat. No. 10,624,444, which is a continuation of application No. 12/531,765, filed as application No. PCT/GB2008/000580 on Feb. 20, 2008, now Pat. No. 9,226,570.

(51) Int. Cl.

| | |
|---|---|
| ***A46B 3/20*** | (2006.01) |
| ***A46B 3/22*** | (2006.01) |
| ***A46B 5/02*** | (2006.01) |
| ***A46B 9/06*** | (2006.01) |
| ***B25G 1/10*** | (2006.01) |
| *A45D 24/02* | (2006.01) |

(52) U.S. Cl.
CPC .............. *A46B 9/026* (2013.01); *A46B 9/028* (2013.01); *A46B 9/06* (2013.01); *B25G 1/102* (2013.01); *A45D 2007/005* (2013.01); *A45D 24/02* (2013.01); *A46B 2200/104* (2013.01); *Y10S 15/05* (2013.01)

(58) Field of Classification Search
CPC ..... A46B 9/028; A46B 9/06; A46B 2200/104; A45D 7/00; A45D 2007/005
See application file for complete search history.

(56) References Cited

U.S. PATENT DOCUMENTS

| | | | | |
|---|---|---|---|---|
| 2,380,730 | A | 7/1945 | Demyanovich | |
| 2,607,064 | A | 8/1952 | Sullivan et al. | |
| D169,131 | S | 3/1953 | Fay | |
| 2,889,567 | A | 6/1959 | Solomon | |
| 3,128,487 | A | 4/1964 | Vallis | |
| 3,181,540 | A | 5/1965 | Abraham | |
| 3,727,260 | A | 4/1973 | Spydevold | |
| 3,949,765 | A | 4/1976 | Vallis | |
| 4,014,064 | A | 3/1977 | Okazaki | |
| D244,568 | S | 6/1977 | Lepisto et al. | |
| 4,211,217 | A | 7/1980 | Gueret | |
| 4,287,898 | A | 9/1981 | Konesky | |
| 4,325,392 | A | 4/1982 | Iten et al. | |
| 4,475,563 | A | 10/1984 | Martin | |
| 4,488,328 | A | 12/1984 | Hyman | |
| 4,619,012 | A | 10/1986 | Wachtel | |
| 4,694,525 | A | 9/1987 | Yamamoto et al. | |
| 4,984,590 | A | 1/1991 | Bachtell | |
| 5,165,760 | A | 11/1992 | Gueret | |
| 5,191,907 | A | 3/1993 | Hirzel | |
| 5,524,319 | A | 6/1996 | Avidor | |
| 5,664,278 | A | 9/1997 | Reisman | |
| 5,673,710 | A | 10/1997 | Schaefer et al. | |
| 5,755,242 | A | 5/1998 | Denebeim | |
| 5,771,904 | A | 6/1998 | Lange et al. | |
| 5,860,432 | A | 1/1999 | Gueret | |
| 6,006,395 | A | 12/1999 | Tiramani | |
| 6,308,717 | B1 | 10/2001 | Vrtaric | |
| 6,357,075 | B1 | 3/2002 | Kaizuka | |
| 6,772,467 | B1 | 8/2004 | Weihrauch | |
| 7,000,618 | B2 | 2/2006 | Dovergne et al. | |
| 7,044,138 | B2 | 5/2006 | Brown | |
| 7,234,472 | B2 | 6/2007 | Ramet | |
| 7,650,893 | B2 | 1/2010 | De Laforcade | |
| 8,051,525 | B2 | 11/2011 | Bernat | |
| 2003/0009838 | A1 | 1/2003 | Nakamura | |
| 2003/0131865 | A1 * | 7/2003 | Richmond | A46B 13/001 132/238 |
| 2003/0163884 | A1 | 9/2003 | Weihrauch | |
| 2005/0028834 | A1 | 2/2005 | Ramet | |
| 2005/0210614 | A1 | 9/2005 | Chang | |
| 2006/0026783 | A1 * | 2/2006 | McKay | A01K 13/002 15/207.2 |
| 2006/0076030 | A1 | 4/2006 | de Laforcade | |
| 2007/0022551 | A1 | 2/2007 | Kuo | |
| 2008/0110471 | A1 | 5/2008 | Oliver | |
| 2010/0101594 | A1 | 4/2010 | Pulfrey | |

FOREIGN PATENT DOCUMENTS

| | | | | |
|---|---|---|---|---|
| DE | 3532734 | | 4/1986 | |
| EM | 00042486-0040 | | 11/2003 | |
| EP | 0 276 969 | | 8/1988 | |
| EP | 1922952 | | 5/2008 | |
| ES | 169707 | U | 10/1971 | |
| ES | 2017154 | A6 | 1/1991 | |
| ES | 1028873 | U | 9/1995 | |
| ES | 2216419 | T3 | 3/2001 | |
| ES | 2204642 | T3 | 4/2002 | |
| FR | 2424003 | A1 | 11/1979 | |
| GB | 630648 | | 10/1949 | |
| GB | 686416 | | 1/1953 | |
| GB | 1043399 | A | 9/1966 | |
| GB | 2412302 | A * | 9/2005 | A46B 9/023 |
| JP | 44-021890 | | 9/1969 | |
| JP | 62-016321 | | 1/1987 | |
| JP | 10127344 | A | 5/1988 | |
| JP | 04-095727 | | 8/1992 | |
| JP | 2000350619 | A | 12/2000 | |
| JP | 200170045 | | 3/2001 | |
| SE | 466044 | | 12/1991 | |
| WO | 88/00446 | | 1/1988 | |
| WO | 2007/010058 | A1 | 1/2007 | |

OTHER PUBLICATIONS

International Search Report published Oct. 2, 2008 for PCT/GB2008/000580 filed Feb. 20, 2008.

Written Opinion of the International Searching Authority for PCT/GB2008/000580 filed Feb. 20, 2008.

British Search Report completed Jul. 11, 2007 for Great Britain Application No. GB0705570.0.

International Preliminary Report on Patentability dated Sep. 29, 2009 for PCT/GB2008/000580.

Japanese Office Action issued Apr. 8, 2013 for patent application No. 2009-554077.

Australian Examination Report dated Feb. 24, 2012 for Australian Patent Application No. 2008231617.

Australian Examination Report dated Oct. 23, 2012 for Australian Patent Application No. 2008231617.

English translation of Brazilian Federal Court Action document entitled "Declaratory Action of Patent Nullity" for Brazilian Patent No. PI 0809158-7, *Kiss Brasil Products de Beleza LTDA* v. *INPI and Tangle Teezer Limited*, Case No. 5054684-38.2025.4.02.5404, Rio de Janeiro, BR, dated Jun. 3, 2025.

* cited by examiner

HAIR CARE DEVICE

FIELD OF THE INVENTION

The invention relates to a hair care device and more particularly to a device for remedying tangles in hair, and especially though not exclusively, wet hair.

BACKGROUND OF THE INVENTION

It is known to use hairbrushes or combs to try to remedy tangles by teasing out tangles in dry or wet hair, such brushes generally having stiff bristles or teeth. This has not been successful and can lead to knots, which sometimes necessitate the knotted hair being cut.

SUMMARY OF THE INVENTION

The term "bristles" as used here is intended to mean filamentary projections generally such as are found on a brush, and includes plastics filamentary projections, and it is not limited herein to animal-hair bristles. In this specification, references to the lengths of such bristles are to be interpreted to mean the length of bristle which projects from a body of a device, in other words the effective length of said bristles.

The invention provides in one of its aspects a hair care device for use in untangling hair comprising a body portion and projecting therefrom a plurality of substantially parallel flexible bristles made of soft plastic material, said bristles being arranged such that over at least a part of the area of said bristles, some of said bristles are of shorter length such that the bristles and the shorter length bristles are interspersed over said at least part of the area of bristles.

Preferably, the shorter length bristles are shorter than the bristles by a uniform amount.

Desirably, the uniform amount is approximately 0.007 meters. The (longer) bristles and shorter bristles are preferably approximately 0.014 and 0.007 meters long, respectively.

Advantageously, the shorter length bristles alternate with the (longer) bristles.

Preferably there is a short bristle at the center of each group of four longer bristles, except at the periphery of the brush, and lines of shorter and longer bristles alternate, the bristles being offset relative to those in adjacent lines.

The free ends of the longer bristles define a (first) surface, and desirably said first surface is curved, the better to conform to the shape of a human head. A greater contact area between the bristles and the head is thus more easily achieved.

It is to be understood that the shorter length bristles need not be all of the same length, and similarly the longer bristles need not be all of the same length. However it is desirable for ease of manufacture that the respective kinds of bristles are all of the same length.

Advantageously, said first surface is concave.

Most preferably the body is shaped, on the area where said bristles reside to be curved and preferably concave, so that it corresponds to the shape of said first surface defined by said free ends of said longer bristles.

The free ends of the shorter bristles also define a second surface, and most preferably the second surface is arranged to be curved and preferably concave, and preferably spaced from said surface by a uniform distance.

Preferably, the body is shaped to fit the palm of a user's hand.

Desirably, the body is provided with a depressed portion to accommodate a thumb of a user.

The body is preferably in two parts, a first raised portion to fit in the palm of a user's hand and a second part attached to the first part and mounting said bristles.

Preferably the bristles are thicker at their base, nearer the brush body, than at their free ends. They may be tapered, or in two or more distinct sections of different thickness. One or more of said sections may be tapered.

Desirably the longer bristles are each in two slightly tapered sections, the thinner section of the longer bristles commencing at a distance from the body such that the longer bristles have a tendency to flex in use at a point approximately at the region of the free ends of the shorter bristles. The plastics material chosen for the bristles must be such that the bristles are resilient and after flexing in use return to their (unflexed) rest position.

The device according to the invention is particularly useful in the application of hair treatment materials, such as colorants to the hair, enabling such treatment materials to be applied uniformly and quickly to the hair.

BRIEF DESCRIPTION OF THE DRAWINGS

Embodiments of the invention will now be described by way of example only with reference to the accompanying drawings in which.

DETAILED DESCRIPTION OF THE INVENTION

Figure 1:
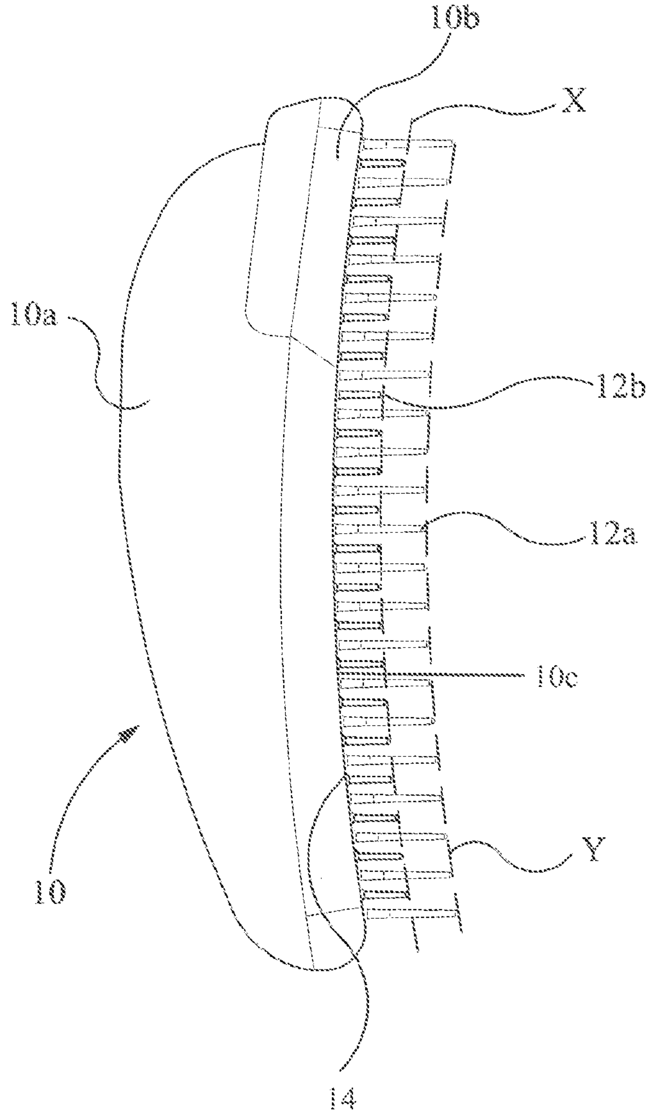
FIG. 1 is a side view of a first hair care device according to the invention.
Figure 2:
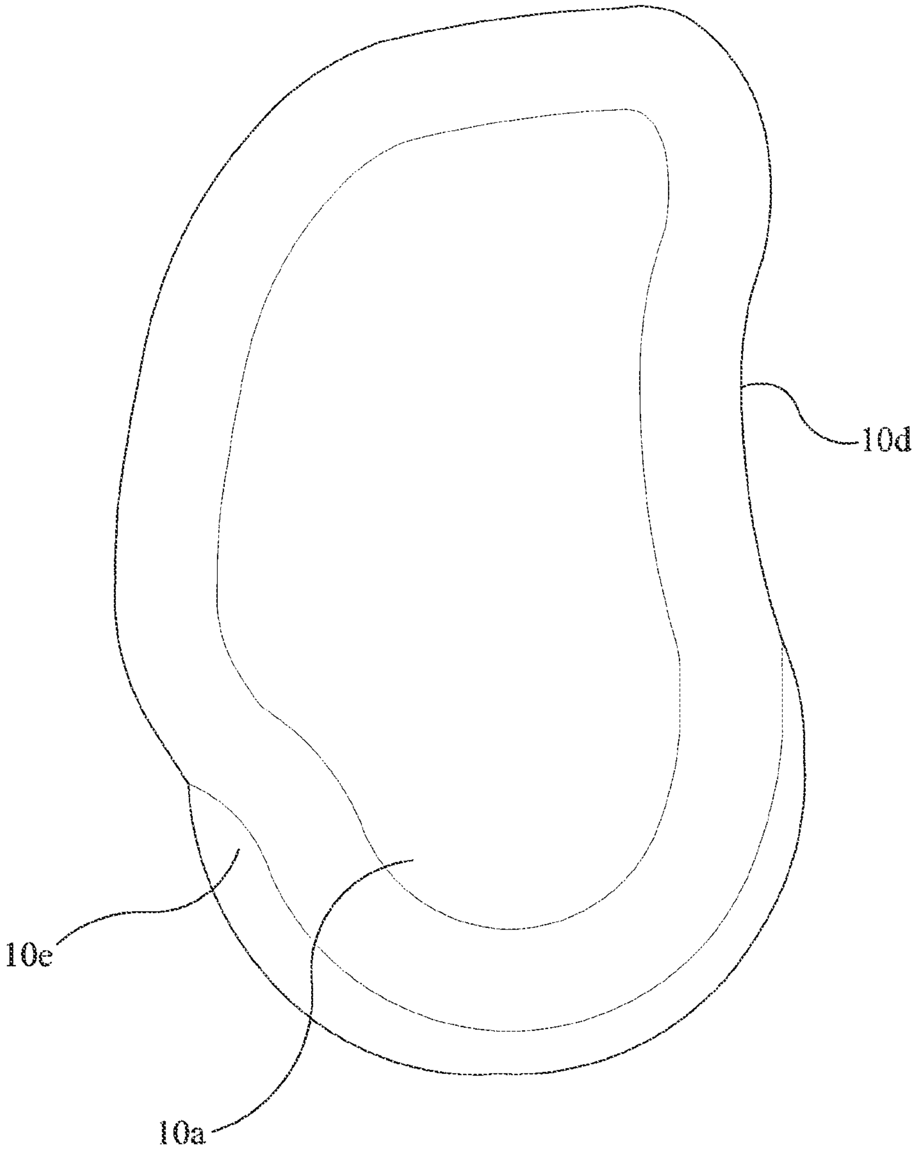
FIG. 2 is a view from above of the hair care device of FIG. 1.
Figure 3:
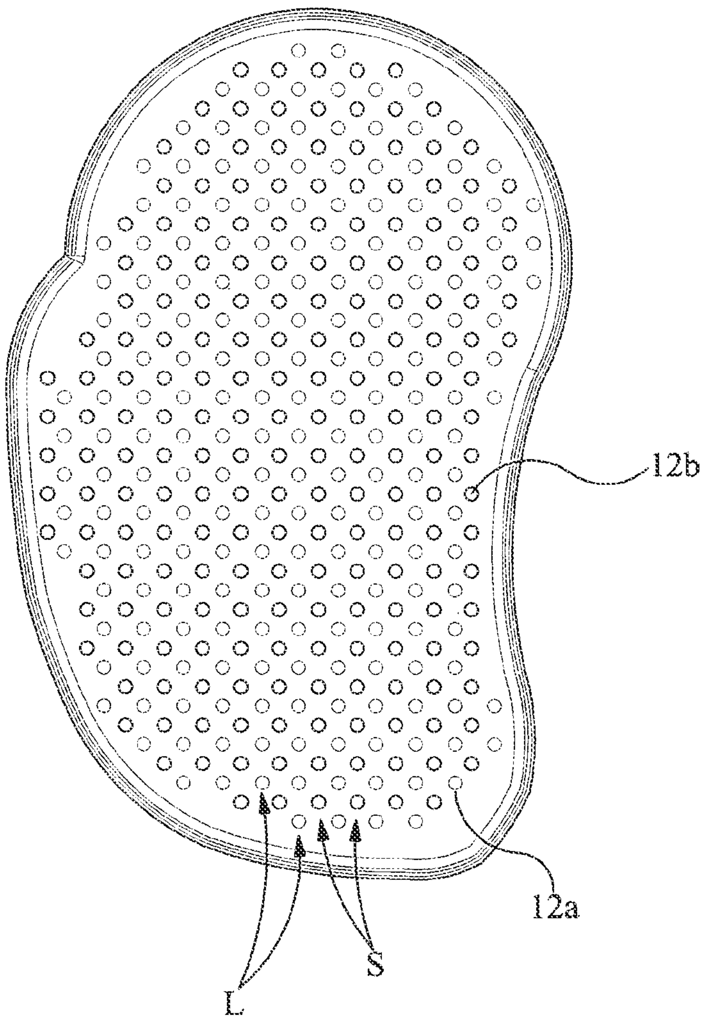
FIG. 3 is a view from below of the hair care device of FIG. 1.

In the hair care device shown in FIG. 1, a body shown generally as 10 is formed from two parts, an upper part 10*a* which is conformed to fit the palm of a user's hand, and a lower part 10*b* which mounts the bristles and which is attached to the upper part 10*a*, by conventional means. The lower part 10*b* has a concavely curved lower surface 10*c* mounting a plurality of parallel bristles. The bristles are of two types.

Figure 4:
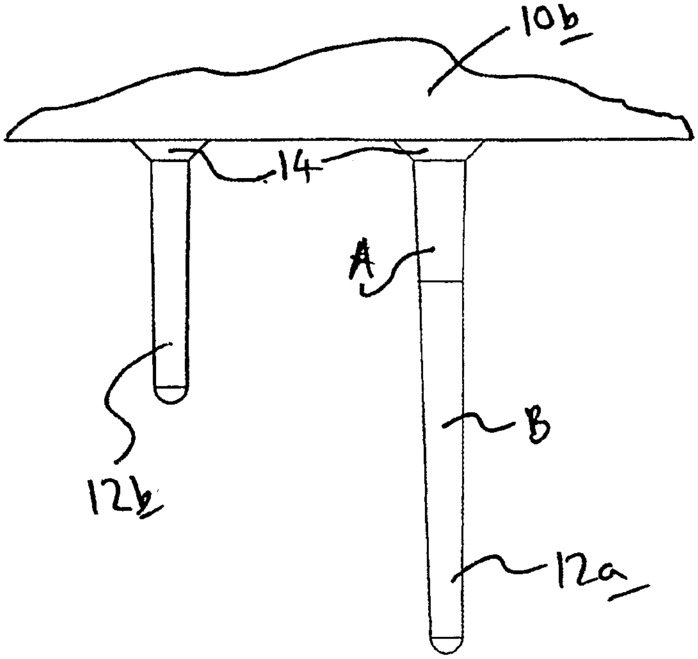
FIG. 4 is a partial schematic view on an enlarged scale of part of the device of FIGS. 1 to 3, showing two adjacent bristles of different sizes.

Longer bristles 12*a* and shorter bristles 12*b* interspersed with the longer bristles 12*a*. These are shown in more detail in FIG. 4. It will be seen that the shorter bristles have a single taper from their root where they originate from the surface 10*c*, whilst the longer bristles have a first thicker tapered portion A and a second, thinner tapered portion B. The difference in bristle lengths is approximately 0.007 meters. In this embodiment each kind of bristles, both short and long, are of equal respective lengths i.e. all the short bristles are of the same length and all the long bristles are of the same length and because the brush is concave, the free end extremities of both sets of bristles form or define respective curved surfaces shown by broken lines X, Y and these surfaces conform to the concave shape of the surface 10*c* of the lower part 10*b*. The bristles are made from a soft plastics material (not the hard plastics material from which conventional styling brushes and combs are made). The soft bristles are intended to be used on wet hair, without the assistance of hot air blowers (which may damage and/or melt the soft bristles), to untangle wet hair. It has been shown by experiment that the untangling capabilities of the brush are superior to those of the known types and it is relatively easy and quick to untangle wet hair following washing of the hair. Typical plastics materials from which the device including its bristles may be produced are as follows:

Body part 10*a* Polypropylene copolymer

Body part 10*b* Engineering thermoplastics elastomer such as HYTREL® (trade mark) made by Messrs Dupont, and in particular HYTREL® 6356 (thermoplastic polyester elastomer)

Filaments 12*a*, 12*b* Engineering thermoplastics elastomer such as HYTREL® (trade mark) made by Messrs Dupont, and in particular HYTREL® 6356 (thermoplastic polyester elastomer).

It will be seen from FIGS. 1-4 that the longer bristles 12*a* and shorter bristles 12*b* cover most of the lower part of the device, and that they are arranged in alternate rows S, L of bristles short, long, short and so on. Also the bristles in one row are offset from those in adjacent rows, so that, say, for a given group of long bristles there is a short bristle centrally disposed between them. The long and short bristles are thus generally interspersed with each other.

It is to be noted that embodiment shown is designed for comfortable use in a right hand, and the top part 10*a* is shaped to fit a user's hand, having an indented portion 10*d* designed to receive the thumb of a user, and a further indented portion 10*e* designed to receive a user's finger to enhance control of movement of the device in a comfortable fashion. A mirror-image version may be provided for use by a left-handed person.

Both sizes of bristles have a chamfer 14 at their base which helps give a firm support at the base of the bristles. Because the thicknesses (about 0.0007-0.001 meters) of the teeth are so fine, without these chamfers stresses on the bristles would be transferred to the base causing the bristles to break off at their base.

The bristles are tapered. This determines where along the length of the bristle it is likely to bend. The bristles must be flexible for ease of detangling the hair. They must also be able to return to their rest position and therefore must have resilience. The taper allows a spring-like movement of the bristles that plays a key role in detangling the hair.

The longer bristles have two tapered sections per bristle and this allows the point at which the bristle will bend occur—nearer the free-end than if there were only one taper.

The shorter length bristles only have one taper therefore the point at which these bristles will bend does not occur as close to their free ends as with the longer bristles even when the ratio of the two different lengths is taken into account The points at which the two bristle lengths bend is important, so that in use of the device, it is applied to the head and gentle pressure is applied towards the head the longer bristles will bend sideways initially whereupon the shorter bristles will come into more intimate contact with the hair.

When the longer bristles have flexed and bent and are no longer capable of picking up any more hair, it is then that the shorter bristles start to catch further strands of hair. This will give two independent actions to detangle the hair that are both working at the same time.

Therefore, the short bristle length needs to correspond to the length to the point of bend of the long bristles or slightly less.

The teeth of conventional combs are rigid and not flexible, and conventional brushes tend to have rigid teeth that are attached to a resilient type base to give pivotability to the teeth but the individual teeth still tend to be rigid. Bristles used in brushes are more flexible and again set on a resilient/rubber type base and usually in a conventional format of a set amount of bristles in a bunch set into the base at regular intervals. The bristles are not generally tapered and just pivot from side to side. When these bristles come into contact with tangled hair they tend to compact the tangles together therefore adding to the problem and reducing the hair's own natural ability to de-tangle itself. Continuing in this manner to remove the tangles results in hair breakage and hair loss (not to be confused with natural hair loss at the root).

The base of the device is preferably concave unlike known brushes or combs to follow the natural contour of the head, to give a more precise direct contact at the roots over a larger surface area. When used on tangle-free hair it ensures the hair stays tangle free and reduces the risk of tangles reforming again The device of the invention can also be used to apply different types of hair treatment materials 9 such as colorants) to the hair, the concave formation of the bristles helps to ensure that the chosen material is evenly distributed from the root right through to the ends of the hair.

Manufacturers of hair color recommend that the hair is not combed while treatment materials, especially colorants are on the hair, as this tends to form tangles in the hair due to combination of the coloring product and the conventional rigid teeth/bristles of the known devices. Generally, to try to remove these tangles and ensure that the hair color is evenly distributed they recommend the use of a coloring brush and the operatives hands. This method can be time consuming and does not guarantee even and complete coverage of the hair with the product Also, manufacturers of hair colorants require that the colorant remains on the hair for a precise set length of time and that they should not to be left on the hair any longer than a stated maximum time before removal. Within this stated time interval the hair may need to be subjected to additional color services or treatments. Some of these additional services may not be capable of being completed, within this time interval and so it may be difficult to make sure that all the hair has been coated evenly from the roots to the ends with the colorant. The time taken to complete these additional services varies from client to client depending on the length of the hair and condition, and often takes far longer to complete than the time interval set by the material manufacturers, who set these time intervals and issue guide lines to try to guarantee optimum hair color results when using their products.

If hair coloring products remain on the hair longer than the manufacturers stated times, this may well affect the final color results achieved, for example that the hair color result is different to the one manufacturer stated would be achieved, and the consequent dissatisfaction/liability problems. Manufacturers generally accept no responsibility for the final color if their stated times and guide lines are not adhered to.

The device according to the invention can be used to distribute color evenly and quickly without tangling, and is particularly useful in distributing hair color evenly from the root to the ends of the hair quickly when usually time-consuming additional color services are required whilst a timed first-color application is in progress, so that these additional services can be completed within the manufacturers time scale for the first application.

What is claimed is:

1. A method of untangling hair, comprising:

using a hairbrush including a body portion having a plurality of substantially parallel flexible bristles projecting therefrom, the plurality of substantially parallel flexible bristles including bristles of at least two different lengths, shorter length bristles and longer length bristles, wherein each of the shorter length bristles is shorter than each of the longer length bristles, and wherein the shorter length bristles are interspersed with the longer length bristles, and wherein the longer length bristles and the shorter length bristles are made of plastics material.

2. The method of claim 1, wherein all of the longer length bristles and all of the shorter length bristles are made of plastics material.

3. A method of untangling hair, comprising:

using a hairbrush including a body portion having a plurality of substantially parallel flexible bristles projecting therefrom, the plurality of substantially parallel flexible bristles including bristles of at least two different lengths, shorter length bristles and longer length bristles, wherein each of the shorter length bristles is shorter than each of the longer length bristles, and wherein the longer length bristles and the shorter length bristles are made of an elastomer; and wherein when using the hairbrush, the longer length bristles release hair, that remains tangled, to an adjacent shorter length bristle when an end of the longer length bristle is bent sideways with respect to the body portion during use, due to the shorter length bristles having a length corresponding to a height of the longer length bristle when the end of the longer length bristle is bent sideways.

4. The method of claim 3, wherein the elastomer is a thermoplastic elastomer.

5. The method of claim 4, wherein the thermoplastic elastomer is a thermoplastic polyester elastomer.

6. The method of claim 3, wherein the longer length bristles include relatively thinner and thicker sections, and wherein the thinner sections commence at a distance from the body portion such that when using the hairbrush the longer length bristles have a tendency to flex at a point approximately at a region of free ends of the shorter length bristles.

7. The method of claim 3, wherein the bristles are tapered such that when using the hairbrush the longer length bristles have a tendency to flex at a point approximately at a region of free ends of the shorter length bristles.

8. The method of claim 3, wherein the longer length bristles and shorter length bristles are formed integrally with a base, from which the longer bristles and shorter length bristles extend.

9. The method of claim 3, wherein when using the hairbrush, the longer length bristles bend at a point between a base and an end of the bristle to a substantially greater extent than bending proximate the base of the longer length bristle.

10. The method of claim 3, wherein a user has applied a hair treatment, and evenly distributes the hair treatment while untangling hair when using the hairbrush.

11. The method of claim 3, wherein a user has applied a hair treatment, and evenly distributes the hair treatment while preventing formation of tangles when using the hairbrush.

12. The method of claim 3, wherein all of the longer length bristles and all of the shorter length bristles are made of an elastomer.

13. A method of untangling hair comprising using a hairbrush, the hairbrush comprising:

a body portion;

a plurality of substantially parallel flexible bristles projecting from the body portion;

the plurality of bristles including shorter length bristles and longer length bristles;

the method including using the hairbrush by pressing and moving the hairbrush against tangled hair whereby the longer length bristles bend sideways when engaging tangled hairs to position free ends of the longer length bristles at free ends of the shorter length bristles and to release hair that remains tangled to the shorter length bristles, whereby the shorter length bristles may untangle the hair that remains tangled.

14. The method of claim 13, wherein the free ends of the longer length bristles collectively define a first curved surface which corresponds to a curve of a human head and the free ends of the shorter length bristles collectively define a second curved surface which corresponds to a shape of a human head.

15. The method of claim 14, wherein the first and second curved surfaces are a uniform distance from each other.

16. The method of claim 13, wherein the longer length bristles include relatively thinner and thicker sections, and wherein the thinner sections commence at a distance from the body portion such that the longer length bristles have a tendency to flex in use at a point approximately at a region of free ends of the shorter length bristles.

17. The method of claim 13, wherein each of the longer length bristles and each of the shorter length bristles has a chamfer at its base.

18. The method of claim 13, wherein the longer length bristles have two tapered sections per bristle.

19. The method of claim 13, wherein the longer length bristles are configured to release hair, that remains tangled, to an adjacent shorter length bristle when an end of the longer length bristle is bent sideways with respect to the body portion during use, the shorter length bristle having a length corresponding to a height of the longer length bristle when the end of the longer length bristle is bent sideways.

20. The method of claim 13, wherein the bristles are resilient, and wherein the longer length bristles bend sideways in use to release tangled hair to a region of free ends of the shorter length bristles, and thereafter straighten in a spring-like movement.

21. The method of claim 13, wherein the hairbrush has a base which is concave to follow a natural contour of a human head.

* * * * *